United States Patent
Goss et al.

(10) Patent No.: US 9,600,670 B2
(45) Date of Patent: Mar. 21, 2017

(54) PROVISIONING LOCATION-BASED SECURITY POLICY

(71) Applicants: Nathaniel J. Goss, Portland, OR (US); Nathan Heldt-Sheller, Portland, OR (US); Kevin C. Wells, Portland, OR (US); Micah J. Sheller, Hillsboro, OR (US); Sindhu Pandian, Portland, OR (US); Ned M. Smith, Beaverton, OR (US); Bernard N. Keany, Lake Oswego, OR (US)

(72) Inventors: Nathaniel J. Goss, Portland, OR (US); Nathan Heldt-Sheller, Portland, OR (US); Kevin C. Wells, Portland, OR (US); Micah J. Sheller, Hillsboro, OR (US); Sindhu Pandian, Portland, OR (US); Ned M. Smith, Beaverton, OR (US); Bernard N. Keany, Lake Oswego, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/580,517

(22) Filed: Dec. 23, 2014

(65) Prior Publication Data

US 2016/0180093 A1    Jun. 23, 2016

(51) Int. Cl.
| | |
|---|---|
| *H04L 29/06* | (2006.01) |
| *G06F 21/57* | (2013.01) |
| *G06F 21/62* | (2013.01) |

(52) U.S. Cl.
CPC ............ *G06F 21/57* (2013.01); *G06F 21/629* (2013.01); *G06F 21/6218* (2013.01); *G06F 2221/034* (2013.01); *G06F 2221/2111* (2013.01)

(58) Field of Classification Search
CPC ..... G06F 21/57; G06F 21/629; G06F 21/6218
(Continued)

(56) References Cited

U.S. PATENT DOCUMENTS

| 8,272,030 B1 | 9/2012 | Annan et al. |
| 2003/0177389 A1* | 9/2003 | Albert ................. H04L 12/2856 726/1 |

(Continued)

FOREIGN PATENT DOCUMENTS

KR    10-2013-0013459    2/2013

OTHER PUBLICATIONS

U.S. Appl. No. 14/493,613, filed Sep. 23, 2014, entitled "Performing Pairing and Authentication Using Motion Information," by Ned M. Smith, et al.

(Continued)

*Primary Examiner* — Michael S McNally
(74) *Attorney, Agent, or Firm* — Trop, Pruner & Hu, P.C.

(57) ABSTRACT

In one embodiment, a system comprises: a processor including at least one core to execute instructions; a plurality of sensors, including a first sensor to determine location information regarding a location of the system; and a security engine to apply a security policy to the system. In this embodiment, the security engine includes a policy logic to determine one of a plurality of security policies to apply based at least in part on the location information, where the location information indicates a location different than locations associated with the plurality of security policies. Other embodiments are described and claimed.

21 Claims, 11 Drawing Sheets

(58) Field of Classification Search
USPC .......................................................... 726/1
See application file for complete search history.

(56) References Cited

U.S. PATENT DOCUMENTS

| | | | | |
|---|---|---|---|---|
| 2004/0123150 | A1* | 6/2004 | Wright | G06F 21/32 726/1 |
| 2004/0123153 | A1* | 6/2004 | Wright | G06F 21/32 726/1 |
| 2005/0055578 | A1* | 3/2005 | Wright | G06F 21/32 726/4 |
| 2005/0193209 | A1* | 9/2005 | Saunders | G06F 7/58 713/182 |
| 2005/0278777 | A1* | 12/2005 | Loza | H04L 63/20 726/4 |
| 2006/0095953 | A1* | 5/2006 | Frank | H04L 9/3231 726/1 |
| 2006/0120526 | A1* | 6/2006 | Boucher | G06F 21/6218 380/247 |
| 2007/0101426 | A1 | 5/2007 | Lee et al. | |
| 2008/0052395 | A1* | 2/2008 | Wright | H04L 63/20 709/224 |
| 2011/0055891 | A1* | 3/2011 | Rice | G06F 21/88 726/2 |
| 2011/0161848 | A1* | 6/2011 | Purcell | G06F 21/554 715/764 |
| 2011/0202970 | A1* | 8/2011 | Kato | H04L 12/2859 726/1 |
| 2012/0102050 | A1 | 4/2012 | Button et al. | |
| 2013/0326578 | A1* | 12/2013 | Blom | G06F 21/6218 726/1 |
| 2014/0208397 | A1* | 7/2014 | Peterson | G06F 21/00 726/4 |
| 2014/0289821 | A1 | 9/2014 | Wilson et al. | |
| 2015/0042449 | A1* | 2/2015 | Suh | G07C 9/00111 340/5.7 |

OTHER PUBLICATIONS

Intel Corporation, "Deeper Levels of Security with Intel Identify Protection Technology," 2012, 9 pages.
U.S. Appl. No. 14/472,645, filed Aug. 29, 2014, entitled "Pairing Computing Devices According to a Multi-Level Security Protocol," by Abhilasha Bhargav-Spantzel, et al.
U.S. Appl. No. 14/493,621, filed Sep. 23, 2014, entitled "Securely Pairing Computing Devices," by Avi Priev, et al.
Frank McKeen, et al., "Innovative Instructions and Software Model for Isolated Execution," 2013, 8 pages.
Matthew Hoekstra, et al., "Using Innovative Instructions to Create Trustworthy Software Solutions," 2013, 8 pages.
Ittai Anati, et al., "Innovative Technology for CPU Based Attestation and Sealing," 2013, 7 pages.
International Searching Authority, "Notification of Transmittal of the International Search Report and the Written Opinion of the International Searching Authority," mailed Mar. 7, 2016, in International application No. PCT/US2015/062370.

* cited by examiner

PROVISIONING LOCATION-BASED SECURITY POLICY

TECHNICAL FIELD

Embodiments relate to enhancing security of computing systems, including location-based security enhancements.

BACKGROUND

Mobile computing devices add convenience for users who want to access data, network and other capabilities anywhere and anytime. Various applications and other features of such devices have been created to help users while they are mobile. Many devices include one or more security solutions to protect the device from unauthorized use or attack. Some of these solutions may consider device location in determining appropriate security measures to take. However, these solutions typically require user interaction and further require the user to remember to update any behavioral changes that might occur at a location. In addition, the user is required to set appropriate policies for specific locations, which increases cognitive load on the user, decreases user experience, and further reduces robustness of security measures.

DETAILED DESCRIPTION

Figure 1:
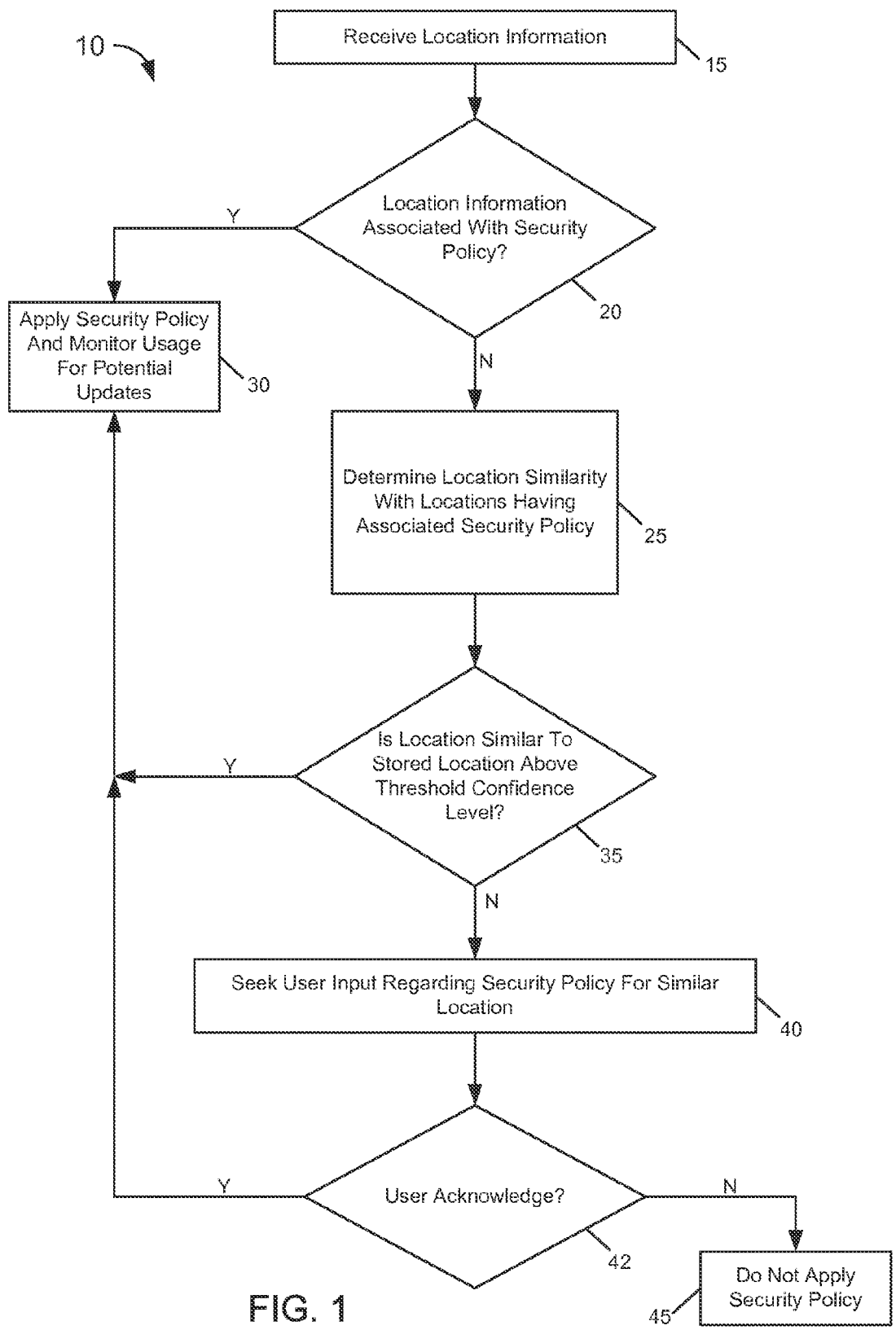
FIG. 1 is a flow diagram of a method for selecting and applying a security policy in accordance with an embodiment of the present invention.

In various embodiments, a security policy may be automatically applied to a system based on location of the system, such as where a mobile device enters a particular location. User experience may be enhanced, as a user need not remember to update security policies for locations. In addition, embodiments may enable dynamic updates to security policies, based on a variety of factors including observation of user behavior at a particular location. To this end, embodiments may implement machine learning techniques to identify a potential update to a location-specific security policy (and automatically updating the policy, potentially after first confirming it with the user).

Still further, embodiments alleviate the burden on a user to remember and/or access appropriate security policies to apply at locations that are similar to each other. In this regard, embodiments may automatically determine when a first location is sufficiently similar to a second location, based at least in part on the locations having similar location semantic context. For example, an ontology may be associated with a first location identifying it as a retail outlet with a public area (e.g., dining, conversation, multiple people) and a security policy is asserted (and possibly confirmed by the user as appropriate). Assume a second location also has an associated ontology, but lacks a location specific security policy. Embodiments may determine semantic similarity between the two locations, and assert a security policy from the first location to apply to the second location. In some cases, e.g., depending on confidence of the similarity, the user may be prompted to approve the assertion or optionally such approval may be omitted if a threshold of similarity confidence is met.

As such, embodiments observe user behavior and make assumptions on how the user likes to interact with the device at particular locations. Still further, policies associated with one location can be automatically applied at another location based on a determined similarity of locations (with or without user affirmation). Embodiments may use a variety of techniques to assert semantic similarity, including but not limited to, use of ontology, similar identifiers such as brand names, logos, business owners, Dun and Bradstreet (DUNS) numbers, or so forth. Note that while features of a given security policy vary, in some cases a location specific security policy may be used to determine: strength of user authentication; duration before a successful authentication session expires; digital, remote and local assets that may be accessed while user at a location, among others. To determine device location, one or more ML classifiers may be used to establish location given multiple sources of location information, including but not limited to fixed location beacons, global positioning system (GPS), wireless local area network (e.g., WiFi), wireless wide area network (e.g., 3G/4G), audio, video, lighting, air quality, and so forth.

In an embodiment, a monitoring logic can observe user behaviors, environmental factors and other contextual factors. This data may then be used to determine whether a security policy for the device is to be updated. In an embodiment, sensor and input device data can be collected passed to be classified via one or more context classifiers. In turn, a policy and analytics engine (PAE) receives classified information and uses it to determine whether a current policy is to be manipulated in a given manner. To do this, a ML location classifier determines location and correlates location to geographic, building, or topology maps. Depending on the results, there could be a permanent update to a security policy for the location, or an update that lasts the duration of the visit. To determine whether policy is to be updated, in some embodiments a user threshold policy can be used to determine when to request user confirmation (and/or when it is permissible to automatically assert an update). This determination may be based at least in part on using a score or confidence value for an update recommendation. For example if a confidence score is greater than 70 and less than 90 then user approval is sought; if the confidence score is greater than 90, then the policy may be directly assigned; and if the confidence score is less than 70, then the policy is not assigned. In any of these cases, the PAE continues to observe sensor and input device data and determine whether a policy change and/or update is appropriate.

Note that in different embodiments, there may be multiple methods for establishing location similarity in the above flow. In one embodiment, string compare operations may be used. In another embodiment, ML classifiers and training data may be used to find similar acoustics, ambient lighting, or other esoteric patterns available via sensors. In yet another embodiment, ontology may be used to approximate similarity based on type classification. In yet further cases combinations of any of these methods may be applied to determine location similarity for automating policy selection.

Referring now to FIG. 1, shown is a flow diagram of a method for selecting and applying a security policy in accordance with an embodiment of the present invention. In various embodiments, method 10 may be performed by logic of a security engine, such as a separate security co-processor of a multi-core processor or other system on chip (SoC). In different embodiments, such logic may be implemented as a combination of hardware, software, and/or firmware, and may take the form, in one embodiment as one or more microcontrollers, finite state machines or other hard coded logic.

As seen method 10 begins by receiving location information (block 15). Such location information may be associated with a location in which a system including the processor is present. For example, in the context of a mobile system such as a smartphone, tablet computer or so forth, a user may be a carrying the mobile device e.g., in a pocket or other location in close proximity to the user. Such location information may be received from different sources, both within and externally from the platform. For example, a global positioning system (GPS) sensor may receive position coordinate information. Other location sensors may also receive the location information, e.g., from a cellular communication system, a wireless local area network or in any other manner, such as a web-based application that leverages certain location information (e.g., GPS data) in order to obtain additional information regarding location, such as text information, e.g., a business name or so forth.

Still referring to FIG. 1, next it can be determined whether the location information is associated with a security policy (diamond 20). That is, the computing device may include a security policy database that includes various security policies, each associated with a particular location or type of location. In general, each security policy may include configuration and other information regarding user and system settings appropriate (e.g., required) for operation in the location, or other security control information, such as availability/unavailability of certain applications and/or hardware devices in a particular location, control of the display of sensitive information and so forth.

As an example, a location policy may specify which of several smartphone, tablet or personal computing devices may be used, accessed or authorized for power-on of a main processor, display screen, universal serial bus (USB), Bluetooth™ Low Energy (BLE), serial or other peripheral device connection logic. The location policy may further identify specific files, folders or other digital content that may be protected by a secure processor, trusted execution environment, or by data encryption using an asymmetric or symmetric encryption algorithm such as Advanced Encryption Standard (AES), elliptic curve cryptography (ECC), or Rivest Shamir Adleman (RSA).

Location control may further distinguish data sensitivity labeling where data sensitivity labels may be associated with hardware, devices, files, folders or other electronic representation of data. Data sensitivity labels may be expressed in terms of a sensitivity level where a higher level represents higher confidentiality protection requirements, or where sensitivity may be expressed in terms of an integrity grading such that a stronger integrity assurance is marked with a different sensitivity label from a lower grade integrity assurance. A sensitivity label may further be distinguished by a categorization scheme where a partitioning of information is determined by its decomposition into smaller constituent parts e.g., a company may consist of multiple departments; sales, marketing, engineering, etc. In still further embodiments, a location policy may specify the authorization a subject is to possess (in the form of a credential or token) that specifies the sensitivity label/level of the resource when the resource is physically or logically located at the coordinates of the location sensors.

Still with reference to FIG. 1, if there is an associated security policy, control next passes to block 30 where the security policy associated with the location information may be applied. Still further, during use of the computing device at the particular location, a monitoring logic may monitor usage of the computing device to determine whether updates to the security policy are appropriate, e.g., based on the manner in which the user is interacting with the computing device at the location. For example, upon entering a secure building, the user may disable a camera component of a smartphone. This type of information may be monitored via the monitoring logic and can be used to determine whether it is appropriate to update the security policy in this way.

Still with reference to FIG. 1, control instead passes from diamond 20 to block 25 if there is no security policy associated with the location. At block 25, it can be determined a location similarity of the current location with one or more locations having an associated security policy. Although the scope of the present invention is not limited in this regard, in an embodiment this determination may be based on execution of one or more classifiers to compare the location information with similar information regarding locations for which valid security policies are present in a security policy database. As described herein, different embodiments may define logically similar locations based on one or more of ontological analysis, machine learned similarity and simple syntactic comparisons (such as a logical location symbol including a franchise name, DUNS number, logo, signature phrases and/or audible tones).

From this determination, control next passes to diamond 35 to determine whether the location is similar to a stored location above a threshold confidence level. The threshold confidence level may be a particular confidence level based on location scoring performed by the one or more classifiers. If it is determined that the location is similar to a stored location (e.g., a Starbucks™ coffee shop in a different city than a Starbucks™ coffee shop for which a security policy is present in the security policy database), control passes to block 30 where the security policy for the similar location can be directly applied.

Otherwise, if the location similarity is not above this threshold confidence level, control passes instead to block 40 where user input may be sought. More specifically, this user input may be via a notification to the user regarding availability of a security policy for a similar location and seeking the user's authorization to apply this similar policy. At diamond 42 it is determined whether the user acknowledges this request. If so, control passes to block 30 where the security policy may be applied. Otherwise, control passes to block 45 where the security policy is not applied. Understand while shown at this high level in the embodiment of FIG. 1, many variations and alternatives are possible.

Figure 2:
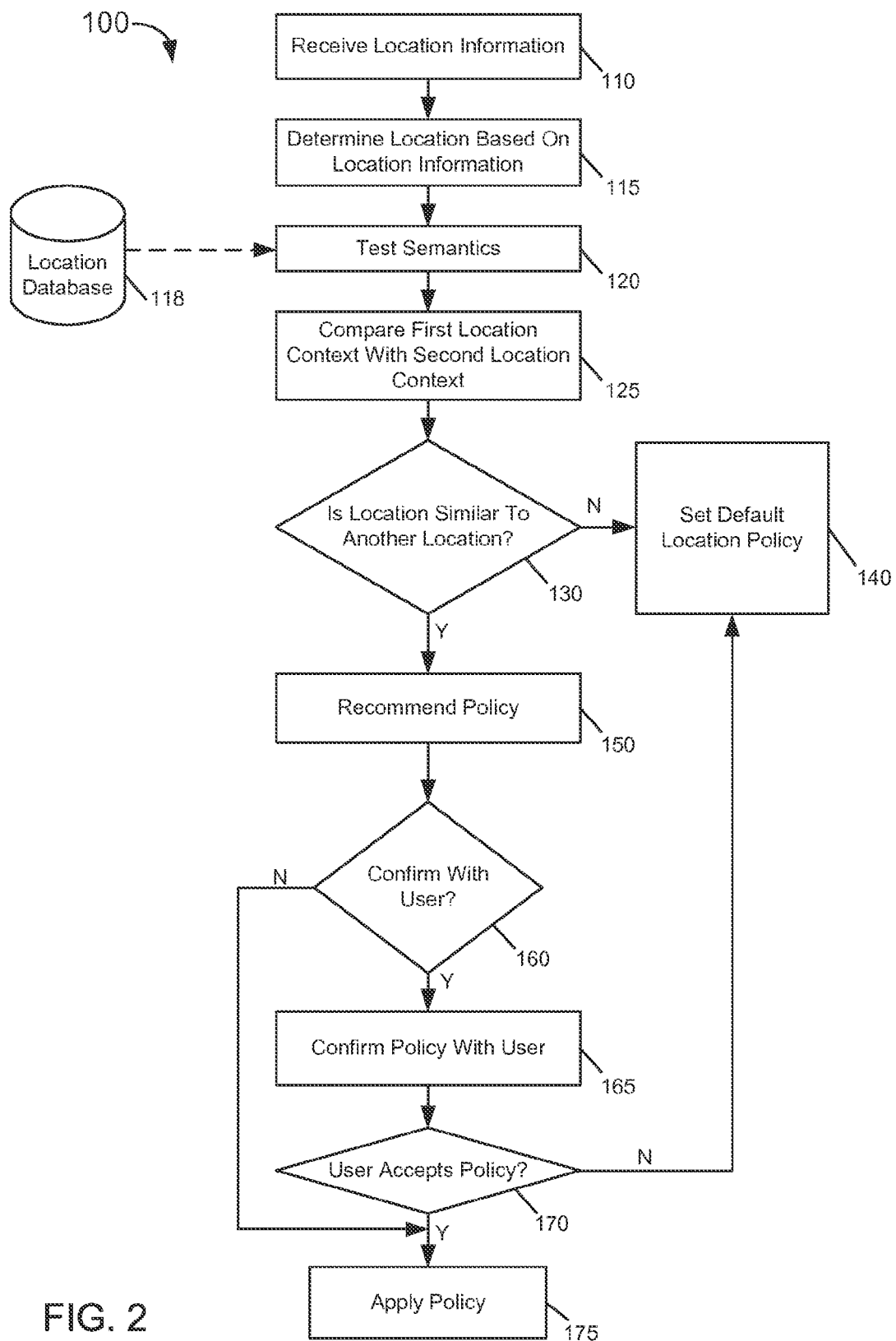
FIG. 2 is a flow diagram of a method for determining and applying an appropriate security policy in accordance with another embodiment of the present invention.

Referring now to FIG. 2, shown is a flow diagram of a method for determining an appropriate security policy to apply based at least in part on a location of a computing device in accordance with another embodiment of the present invention. As shown in FIG. 2, method 100 may be performed by a combination of hardware, software and/or firmware, including logic of a security engine. Method 100 begins by receiving location information (block 110). Such location information may be received from a variety of sensors and input devices of a system, including location sensors. Next at block 115 a location of the device may be determined based on this location information. In an embodiment, a policy and analytics engine may execute a machine learning location classifier to determine such location. Next control passes to block 120, where various semantics may be tested with reference to this location and further using information present in a location database 118, which may be a local database that associates various locations with available security policies. In other cases, such information may be obtained from a remote database such as a cloud-based storage.

Still with reference to FIG. 2, control next passes to block 125 where location context for the current location can be compared with location context for a second location (e.g., a given location present in this location database). In an embodiment, the comparison may be based on one or more of an ontology, a string comparison, a DUNS number comparison or so forth. Control next passes to diamond 130 to determine whether the current location is similar to one or more locations in this database. If not, control passes to block 140 where a default location policy may be selected. This default security policy may assume that the computing device is in a public location and as such, certain security protection features are enabled.

If the current location is determined to be similar to a stored location (with an associated security policy), control passes to block 150 to recommend the policy. Next at diamond 160 it is determined whether to confirm the policy with the user. In one embodiment, this determination as to whether to confirm with the user may be based on a confidence level of the similarity of location to the location having the recommended security policy. For example, a score or confidence level of the similarity can be compared to a threshold confidence level. If the score is greater than the threshold confidence level, control may directly pass to block 175 where the security policy may be directly applied, for example, by configuring the system for the selected policy, e.g., controlling settings, controls or use restrictions according to the selected policy.

If user confirmation is to be sought, control passes to block 165 where the system can seek user confirmation, e.g., by display of an appropriate dialog box and seeking user input regarding the recommended security policy for the particular location and the details regarding the policy itself. Next at diamond 170, it is determined whether the user confirms the policy. If not, a default location policy is set in the system (block 140). Otherwise, control passes to block 175, to apply the security policy. Understand while shown at this high level in the embodiment of FIG. 2, many variations and alternatives are possible.

Figure 3:
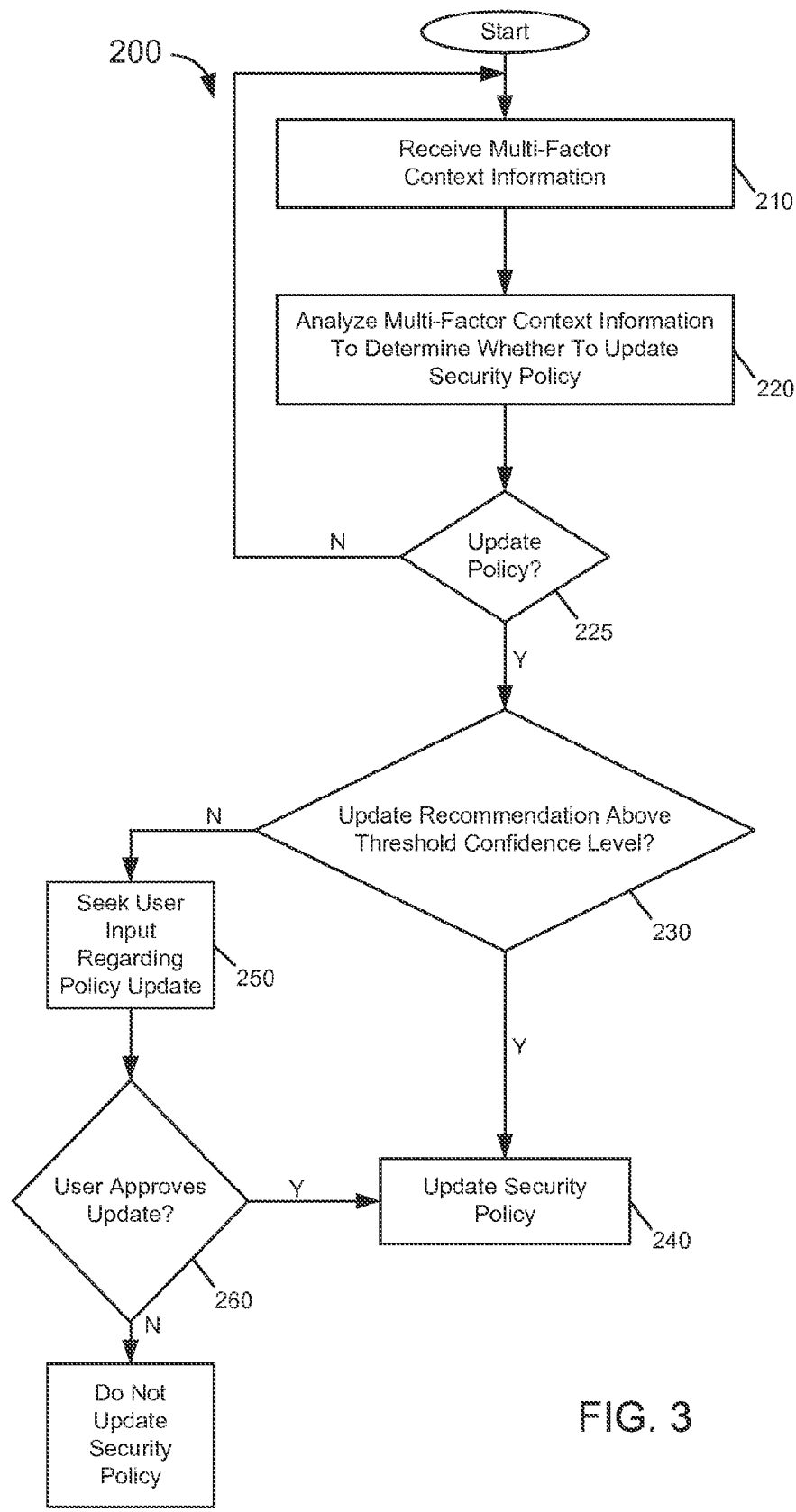
FIG. 3 is a flow diagram of a method for updating a security policy in accordance with an embodiment of the present invention.

Referring now to FIG. 3, shown is a flow diagram of a method for updating a security policy in accordance with an embodiment of the present invention. As shown in FIG. 3, method 200 may be performed by a combination of hardware, software and firmware, including logic of a security engine. Method 200 begins by receiving multi-factor context information (block 210). This multi-factor context information may be received during operation of a computing device at a particular location. While the content of such multi-factor context information may vary widely, in certain embodiments this information may include user interaction with a computing device, location information, environmental information, among other such information. This information may be analyzed to determine whether to update a security policy by generation of an update recommendation (block 220). This determination may be based at least in part by execution on one or more classifiers that determine whether a security update is appropriate. Thus at diamond 225 it is determined whether a policy is to be updated for this recommendation. If not, continued receipt and analysis of context information may occur at blocks 210 and 220.

Instead if it is determined to update the policy, control passes from diamond 225 to diamond 230 to determine whether the update recommendation exceeds a threshold confidence level (diamond 230). For example, a classifier may output a recommendation value to be compared to a threshold confidence level. If the recommendation value exceeds the threshold confidence level, control passes to block 240 where the security policy may be directly updated. For example, the policy for the given location may be updated based on user behavior and interaction such that a particular application is launched when the user enters the location. Otherwise if it is determined that the update recommendation does not exceed the threshold confidence level, control passes to block 250 where user input may be sought regarding the policy update. As above, this user input may be via a notification to the user regarding the policy update recommendation and seeking the user's authorization to update the policy in this way. If the user approves the update (diamond 260), control passes back to block 240 where the security policy is updated. Otherwise, the security policy is not updated (block 270). Understand while shown at this high level, many variations and alternatives are possible.

Figure 4:
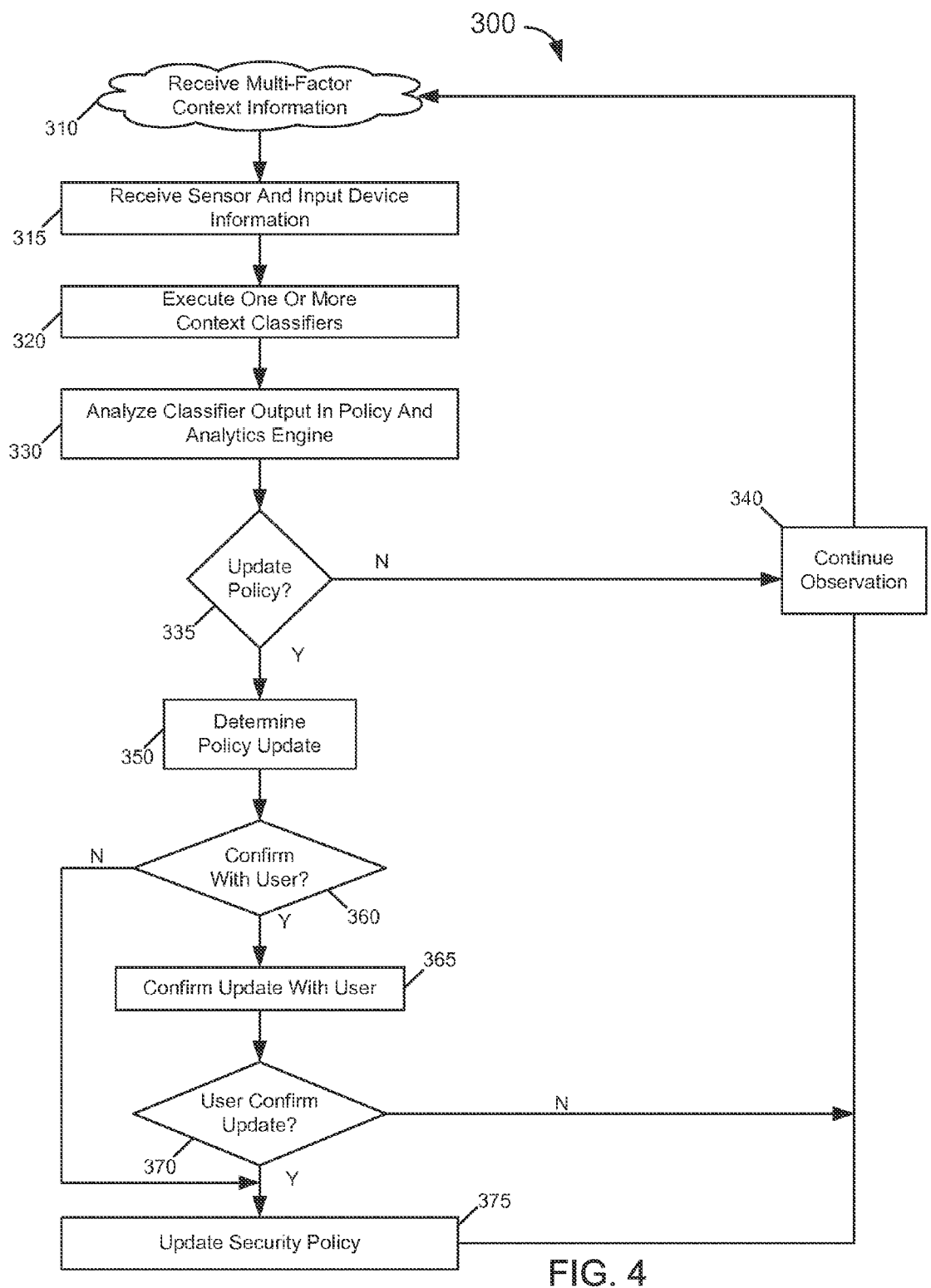
FIG. 4 is a flow diagram of a method for updating a security policy in accordance with another embodiment of the present invention.

Referring now to FIG. 4, shown is a flow diagram of a method for updating a security policy in accordance with another embodiment of the present invention. As shown in FIG. 4, method 300 may similarly be performed by a combination of hardware, software and/or firmware, including logic of a security engine. In the illustration shown, method 300 begins by receiving multi-factor context information (block 310). Such information may include user behavior and environmental factors at a location of a system, among other contextual factors. In addition, sensor and input device information may be received (block 315). Responsive to receipt of all of this information, one or more context classifiers may be executed (block 320). The context classifiers may include one or more machine learning classifiers. While in various embodiments such classifiers may be implemented in logic of a particular computing device, it is possible also to leverage computing resources and classifiers at a cloud-based location such that interaction between a local computing device and the cloud location occurs.

Still with reference to FIG. 4, control next passes to block 330 where the classifier(s) output may be analyzed in a policy and analytics engine. For example, output from a location classifier may determine a location of the computing device, and this policy and analytics engine correlates the location to various information, including geographic information, building information, topology maps or so forth. Based on the analysis, which may include application of a location algorithm to establish a semantic equivalence between an existing geographic location and a new geographic location that is semantically equivalent to the first geographic location, it can be determined whether update to a security policy is determined to be recommended (diamond 335). Note that in some cases, if semantic equivalence exists, then the access control policy may be automatically updated to include the second geographic location such that the actual access policy is expressed in terms of unambiguous geographic coordinates. Evaluation of the access policy may be applied using geographic coordinates and may be performance tuned for efficient processing. If no security policy is to be recommended, control passes to block 340 where continued observation regarding various context factors may occur.

Still with reference to FIG. 4, otherwise if a policy update is recommended, control passes to block 350 to determine the policy update. While the scope of the present invention is not limited in this regard, in some cases this determination may be based on extent of geographic similarity. When such update is determined, control passes to diamond 360 to determine whether to confirm the policy change with the user. In one embodiment, this determination as to whether to confirm with the user may be based on a confidence level of the recommendation for the policy security policy update. For example, a score or confidence level of the recommendation can be compared to a threshold confidence level. If the score is greater than the threshold confidence level, control may directly pass to block 375 where the security policy may be updated, for example, by adding one or more additional settings, controls or use restrictions in the policy and updating the stored (and applied) policy in this regard.

If user confirmation is to be sought, control passes to block 365 where the system can seek user confirmation, e.g., by display of an appropriate dialog box and requesting user input regarding the security policy to be updated and the details regarding the update itself. Next at diamond 370, it is determined whether the user confirms the update. If not, continued observation of system use may occur at block 340. Otherwise, control passes to block 375, discussed above to perform the security policy update. Understand while shown at this high level in the embodiment of FIG. 4, many variations and alternatives are possible.

Note that in different embodiments, there may be multiple methods for establishing location similarity. In one embodiment, string compare operations may be used. In another embodiment, ML classifiers and training data may be used to find similar acoustics, ambient lighting, or other esoteric patterns available via sensors. In yet another embodiment, ontology may be used to approximate similarity based on type classification. In yet further cases, combinations of any of these methods may be applied to determine location similarity for automating policy selection.

In some cases, a string comparison may be performed between map data and data from a general knowledge database (which may be available on the device, or accessible via a cloud-based storage) to determine whether two locations are similar or the same. For example, a user walks into a Starbucks™ store, and the user's device receives map data indicating that it is within or approximately at the Starbucks™ store. Then a classifier may compare that string to information of a security policy database to determine whether there is a Starbucks™ policy that already exists, and ask the user whether such policy is to be applied.

Figure 5:
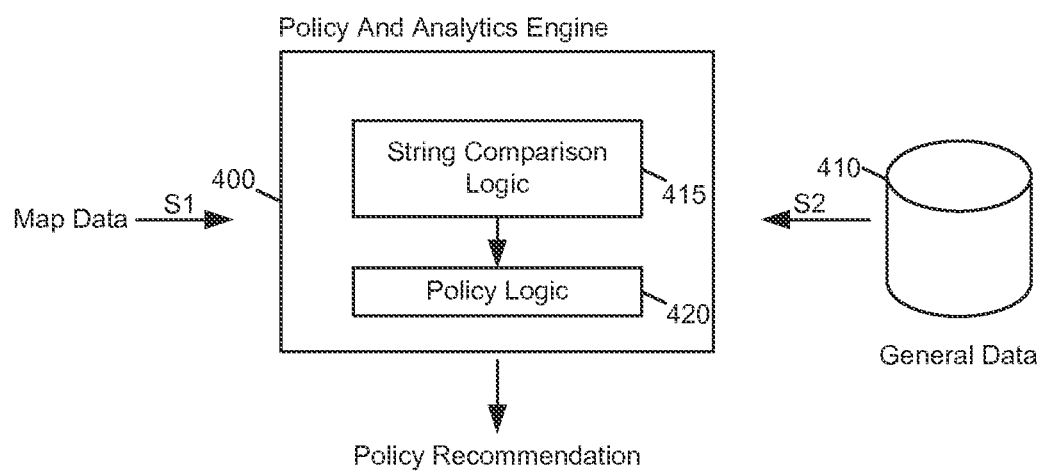
FIG. 5 is a block diagram of a policy and analytics engine in accordance with an embodiment.

Referring now to FIG. 5, shown is a block diagram of a policy and analytics engine in accordance with an embodiment. As shown in FIG. 5, PAE 400 includes as string comparison logic 415. As seen, comparison logic 415 is configured to receive incoming data (strings) from various sources. In the embodiment shown, a first string is received from map data, e.g., determined from one or more sensors and with further reference to a map database with associates location information with a given string, such as a business name. In addition, comparison logic 415 is configured to receive a second string from a database 410, which may store general data. In an embodiment, these strings may be string representations of identifiers or qualifiers, where syntactic matching of names, logos, phrases or audible tones may identify a vendor, retailer, person or other entity property or place of business or retail outlet. For example the string "Target" associated with a first location may be used to identify a second location having the same "Target" string in a string that identifies the retailer. In different cases, database 410 may be stored in a storage of the system (e.g., a given non-volatile storage) or may be stored at a remote, e.g., cloud-based location. As seen, string comparison logic 415 performs a string comparison and provides an output to a policy logic 420. In turn, policy logic 420 is configured to generate a policy recommendation, e.g., based on whether the strings match. In this case, when a first input string matches the second input strings, this means there is a match by name and thus a corresponding policy associated with the second string (as stored in a policy database) may be used as an appropriate security policy, given the similarity based on the string comparison. Although shown at this high level in the embodiment of FIG. 5, many variations and alternatives of a PAE are possible.

Figure 6:
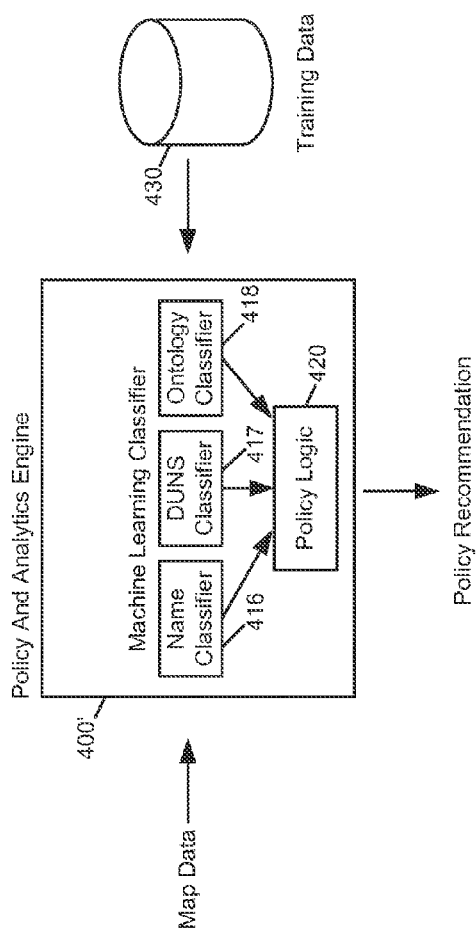
FIG. 6 is a block diagram of a policy and analytics engine in accordance with another embodiment.

Referring now to FIG. 6, shown is a block diagram of a policy and analytics engine in accordance with another embodiment. In the embodiment shown in FIG. 6, PAE 400' includes a plurality of machine learning classifiers, including a name classifier 416, a DUNS classifier 417 and an ontology classifier 418. Note that name classifier 416 may generally correspond to string comparison logic 415 of FIG. 5. In the embodiment of FIG. 6, the various classifiers are configured to receive input information based on received location information (namely map data). For example, name classifier 416 may receive a text string, DUNS classifier 417 may receive a DUNS number, and ontology classifier may receive a first location ontology, all of these associated with a given location in which the device is situated, based on map data. In addition, the classifiers are configured to receive training data from a training database 430. In general, training database 430 is configured to store training data obtained from a large population of devices and locations. The training data are analyzed to identify correlations across the various physical locations. The training data is used to assist multiple factors on the device find a multi-vectored match.

In an embodiment, at least some training data are collected during a training mode in which the sensors used to feed the ML algorithm to record sample data that is taken to be characteristic behavior. The training data becomes a reference sample. When training is ended, the mode changes to operational mode where the sensors collect sample data that are compared to the reference. The variance determines a fuzzy match where a threshold of acceptable variance is exceeded and the sample is determined to be different from the reference. As one example, assume a fingerprint reader takes a sample of a thumbprint to establish a reference sample. A second sampling produces a data set that is similar but not the same as the reference. The statistical difference of each artifact is compared to a threshold value. The threshold determines when the sample is accepted/rejected.

Based on the classifications performed in these various classifiers, outputs are provided to a policy logic 420 that in turn generates a policy recommendation. In some cases, policy logic 420 may include a top level classifier, namely a location policy classifier that determines relative match or confidence level of similarity based on the results of each of these sub-classifiers. In some embodiments, policy logic 420 may differently weight the sub-classifiers. For example, the output of ontology classifier 418 may be weighted higher than the output of at least one of the other classifiers, as an ontological classification encodes semantic knowledge more precisely than a syntactic match. For example, the word 'target' may refer to a popular retailer or it may refer to a place to throw things. Again, a user threshold policy can determine when it is appropriate to request confirmation from the user and when a similarity may be automatically asserted.

As described, a policy analytics engine can use ontology to find approximate semantic matching locations. In one embodiment, using an ontology, the PAE can determine similarity based on a relative path through an ontology, where 'IS-A' and 'HAS-A' relationships are similar but where attribute values may differ widely. For example, in the same scenario as above, if a user walks into a Peet's Coffee™ shop, the ontology associated with Peet's may be:

Thing•Place of business•Retail business•Coffee shop; with a name attribute CoffeeShopName="Peet's Coffee".

The ontology for Starbucks may be:

Thing•Place of business•Retail business•Coffee shop; with a name attribute CoffeeShopName="Starbucks".

Since Starbucks and Peet's are both coffee shops, the PAE may determine (e.g., by inference) that the same security policy can be used for both places, even though a string comparison over name does not match.

Figure 7:
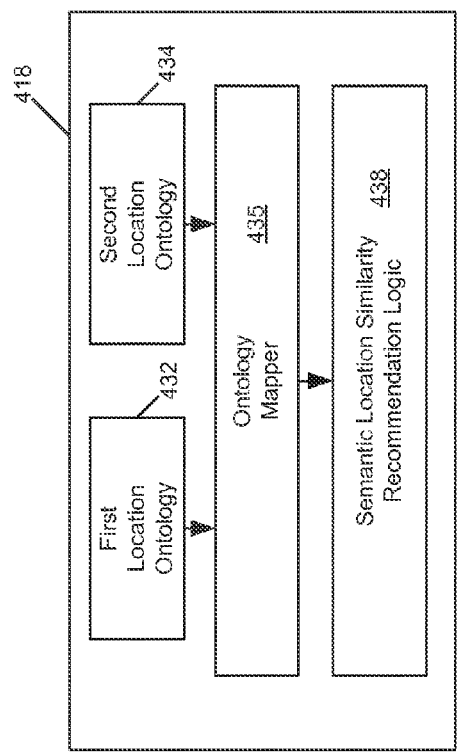
FIG. 7 is a block diagram of an ontology classifier in accordance with an embodiment.

Referring now to FIG. 7, shown is a block diagram of an ontology classifier in accordance with an embodiment. As seen in FIG. 7, classifier 418 receives multiple incoming ontologies, namely a first location ontology 432 and a second location ontology 434. Note that these ontologies may be Starbucks™ and Peet's™ ontologies. These different ontologies are provided to an ontology mapper 435 which performs a comparison of the two ontologies and passes results to a semantic location similarity recommendation logic 438, which generates a recommendation or similarity between the two different ontologies. For example, with the above example a relatively high confidence level may be established that the two locations are coffee shops although the text strings are different, the other sub-elements of the ontologies have a high level of similarity. Understand while shown at this high level in the embodiment of FIG. 7, many variations and alternatives are possible.

Figure 8:
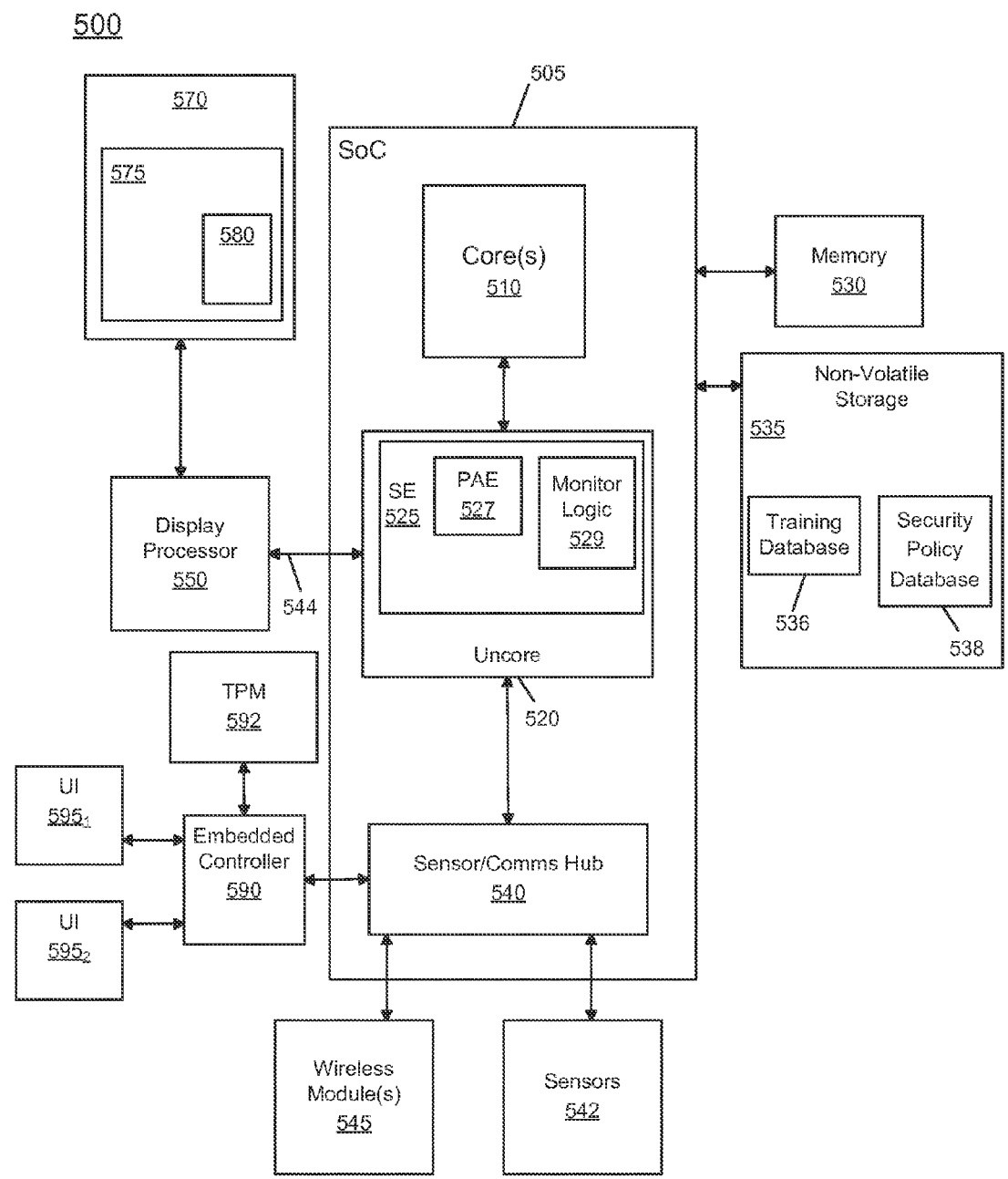
FIG. 8 is a block diagram of a system arrangement in accordance with an embodiment of the present invention.

Referring now to FIG. 8, shown is a block diagram of a system arrangement in accordance with an embodiment of the present invention. As seen in FIG. 8, system 500 may be a user platform such as a mobile device, tablet, phablet, personal computer (or other form factor) and includes SoC 505, which may be a multicore processor. SoC 505 can include secure execution technologies to set up a trusted execution environment to be used as described herein. In different embodiments, the TEE may be implemented using Intel® SGX technology, Intel® TXT technology, or an ARM TrustZone. To this end, implementations may include various hardware, both general-purpose and specialized security hardware, to create a TEE and perform location-based security policy assignment, updating and enforcement operations in such environments.

As seen in the embodiment of FIG. 8, SoC 505 includes a plurality of cores 510, which may be a set of homogeneous or heterogeneous cores, such as a mix of in-order and out-of-order cores, low power and higher power cores, cores of different instruction set architectures or so forth. Cores 510, which may be in one or more core domains configured to operate at independent voltage and frequency levels, coupled to an uncore 520 which may include various non-core circuitry of a processor, such as one or more levels of a cache memory, a system agent, one or more integrated memory controllers, a power management unit and security logic such as a security engine 525.

In the embodiment shown, security engine 525, which may be configured to create a TEE and execute in such trusted environment, includes a policy and analytics engine 527 and a monitor logic 529. PAE 527 may generally include one or more classifiers, including multiple sub-classifiers and a master classifier. In addition, PAE 527 may include policy logic as described herein to perform one or more of the methods described above with regard to location-based security policy identification and application and updates as appropriate. In turn, monitor logic 529 may be configured to monitor various system contexts, including user behavior, location and environmental information and so forth, and provide such information to PAE 527 to determine whether one or more changes or updates to a given security policy may be appropriate and to be recommended. As further shown in FIG. 8, SoC 505 further includes a sensor/communications hub 540 to which various sensors and modules may be adapted.

For purposes of location-based security policy operations, such sensors 543 can include biometric input sensors, one or more motion sensor devices, and a global positioning system (GPS) module or other dedicated location sensor. In an embodiment, other sensors such as inertial and environmental sensors also may be present. As several examples, an accelerometer, a force detector, an acoustic sensor, and an ambient light detector may be provided and information obtained from these sensors can be used for the security policy control described herein. Also, in various embodiments one or more wireless communication modules 545 may be present to enable communication with local or wide area wireless networks such as a given cellular system in accordance with a 3G or 4G/LTE communication protocol.

Still with reference to FIG. 8, various portions of a memory system couple to SoC 505. In the embodiment shown, a system memory 530 (e.g., formed of dynamic random access memory (DRAM)) and a non-volatile storage 535, which may take the form of one or more flash memories, disk drive or other mass storage, are present. For purposes of location-based security policy operations described herein, non-volatile storage 535 may store a training database 536, which as discussed above may include various training information to be used in determining an appropriate security policy to apply to a system in a given location. Still further, a security policy database 538 may store multiple security policies already generated. Such security policy database may include multiple entries, each associated with a particular location and having an associated security policy, which may provide various information regarding configuration and control of a system at the associated location.

As further seen in FIG. 8, platform 500 may further include a display processor 550 that can be coupled to uncore 520 via channel 544, which may be a trusted channel, in some embodiments. As seen, display processor 550 may couple to a display 570 that can be a touch screen display to receive user input. Thus in this example, configured within the display may be a touch screen 575 and a touch screen controller 580 (which of course is hidden behind the display itself). Other user interfaces, namely user interfaces 595$_1$ and 595$_2$ which in an example can be a keyboard and a mouse, may be coupled via an embedded controller 590.

Figure 9:
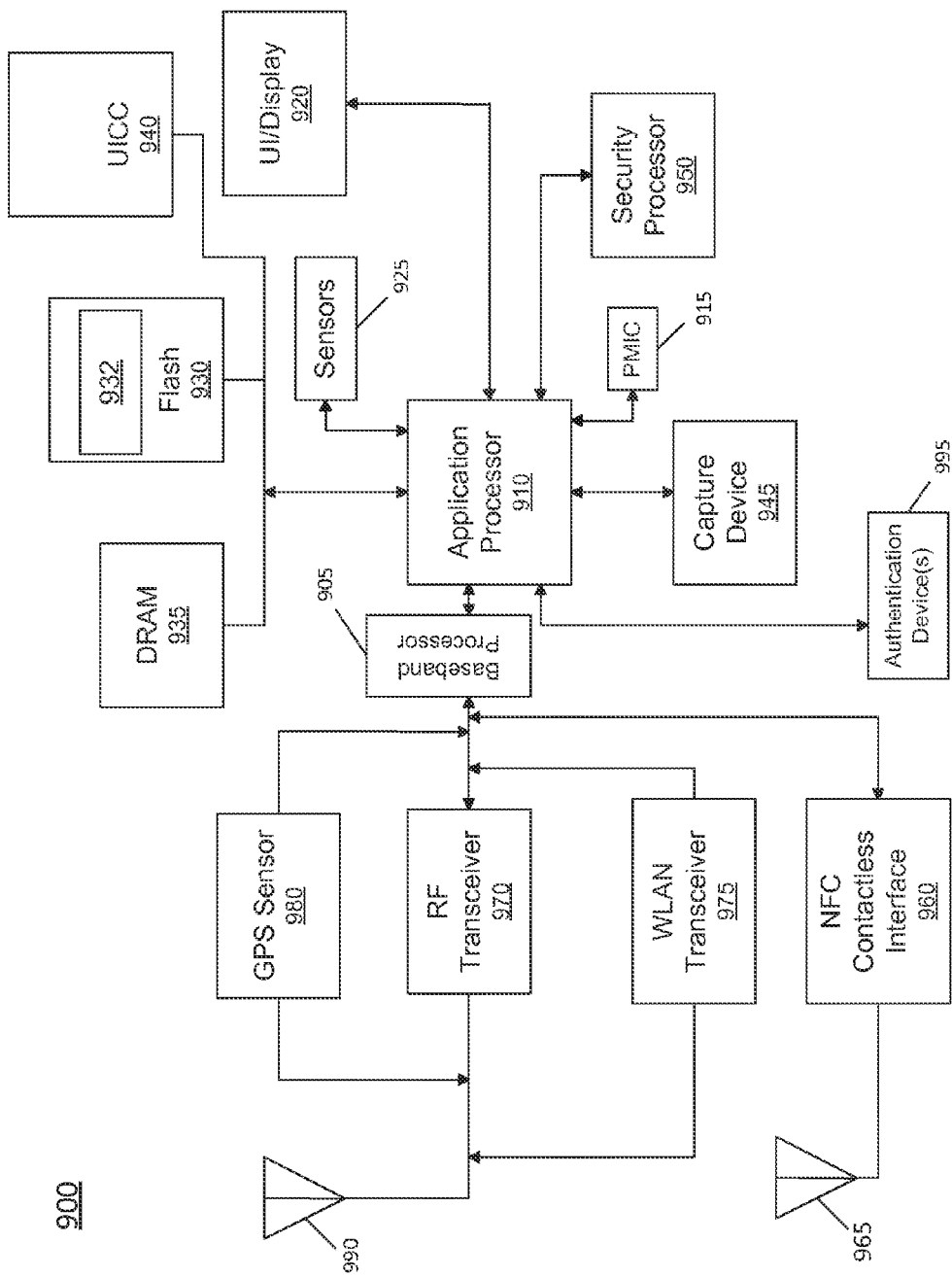
FIG. 9 is a block diagram of an example system with which embodiments can be used.

Embodiments may be implemented in an SoC or other processor for incorporation into a wide variety of platforms. Referring now to FIG. 9, shown is a block diagram of an example system with which embodiments can be used. As seen, system 900 may be a smartphone or other wireless communicator. A baseband processor 905 is configured to perform various signal processing with regard to communication signals to be transmitted from or received by the system. In turn, baseband processor 905 is coupled to an application processor 910, which may be a main CPU of the system to execute an OS and other system software, in addition to user applications such as many well-known social media and multimedia apps. Application processor 910 may further be configured to perform a variety of other computing operations for the device. In the context of location-based security policy operations, understand that application processor 910 may be an SoC including one or more security processors configured to perform location-based security policy generation, identification, and updates based at least in part on user behavior, location determination and similarity to one or more existing locations having associated security policies, as described herein.

In turn, application processor 910 can couple to a user interface/display 920, e.g., a touch screen display. In addition, application processor 910 may couple to a memory system including a non-volatile memory, namely a flash memory 930 and a system memory, namely a DRAM 935. In some embodiments, flash memory 930 may include a secure portion 932 in which a security policy database and one or more other databases may be stored. As further seen, application processor 910 also couples to a capture device 945 such as one or more image capture devices that can record video and/or still images.

Still referring to FIG. 9, a universal integrated circuit card (UICC) 940 comprises a subscriber identity module, which in some embodiments includes a secure storage to store secure user information. System 900 may further include a security processor 950 that may couple to application processor 910. In various embodiments, security processor 950 may be used in part to set up a TEE. A plurality of sensors 925 may couple to application processor 910 to enable input of a variety of sensed information such as accelerometer and other environmental information. In addition, one or more authentication devices 995 may be used to receive, e.g., user biometric input for use in authentication operations.

As further illustrated, a near field communication (NFC) contactless interface 960 is provided that communicates in a NFC near field via an NFC antenna 965. While separate antennae are shown in FIG. 9, understand that in some implementations one antenna or a different set of antennae may be provided to enable various wireless functionality.

A power management integrated circuit (PMIC) 915 couples to application processor 910 to perform platform level power management. To this end, PMIC 915 may issue power management requests to application processor 910 to enter certain low power states as desired. Furthermore, based on platform constraints, PMIC 915 may also control the power level of other components of system 900.

To enable communications to be transmitted and received, various circuitry may be coupled between baseband processor 905 and an antenna 990. Specifically, a radio frequency (RF) transceiver 970 and a wireless local area network (WLAN) transceiver 975 may be present. In general, RF transceiver 970 may be used to receive and transmit wireless data and calls according to a given wireless communication protocol such as 3G or 4G wireless communication protocol such as in accordance with a code division multiple access (CDMA), global system for mobile communication (GSM), long term evolution (LTE) or other protocol. In addition a GPS sensor 980 may be present, with location information being provided to security processor 950 for use as described herein. Other wireless communications such as receipt or transmission of radio signals, e.g., AM/FM and other signals may also be provided. In addition, via WLAN transceiver 975, local wireless communications, such as according to a Bluetooth™ or IEEE 802.11 standard can also be realized.

Figure 10:
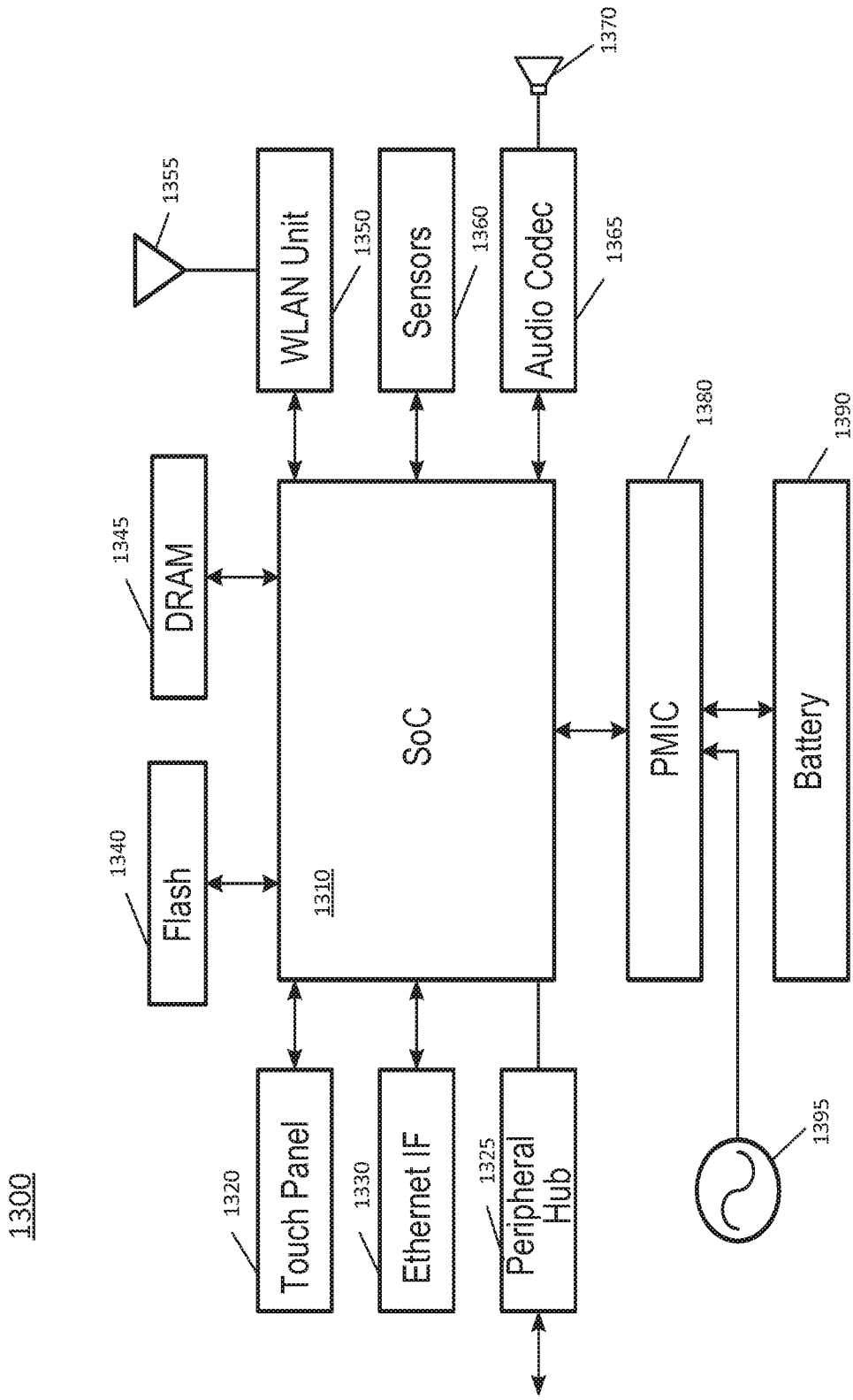
FIG. 10 is a block diagram of an example system with which embodiments may be used.

Referring now to FIG. 10, shown is a block diagram of an example system with which embodiments may be used. In the illustration of FIG. 10, system 1300 may be mobile low-power system such as a tablet computer, 2:1 tablet, phablet or other convertible or standalone tablet system. As illustrated, a SoC 1310 is present and may be configured to operate as an application processor for the device. SoC 1310 may include hardware, software, and/or firmware as described herein to provide location-based security policy operations.

A variety of devices may couple to SoC 1310. In the illustration shown, a memory subsystem includes a flash memory 1340 (which may store a plurality of OEM provisioned manifests as described herein) and a DRAM 1345 coupled to SoC 1310. In addition, a touch panel 1320 is coupled to the SoC 1310 to provide display capability and user input via touch, including provision of a virtual keyboard on a display of touch panel 1320. To provide wired network connectivity, SoC 1310 couples to an Ethernet interface 1330. A peripheral hub 1325 is coupled to SoC 1310 to enable interfacing with various peripheral devices, such as may be coupled to system 1300 by any of various ports or other connectors.

In addition to internal power management circuitry and functionality within SoC 1310, a PMIC 1380 is coupled to SoC 1310 to provide platform-based power management, e.g., based on whether the system is powered by a battery 1390 or AC power via an AC adapter 1395. In addition to this power source-based power management, PMIC 1380 may further perform platform power management activities based on environmental and usage conditions. Still further, PMIC 1380 may communicate control and status information to SoC 1310 to cause various power management actions within SoC 1310.

Still referring to FIG. 10, to provide for wireless capabilities, a WLAN unit 1350 is coupled to SoC 1310 and in turn to an antenna 1355. In various implementations, WLAN unit 1350 may provide for communication according to one or more wireless protocols, including an IEEE 802.11 protocol, a Bluetooth™ protocol or any other wireless protocol.

As further illustrated, a plurality of sensors 1360 may couple to SoC 1310. These sensors may include various accelerometer, environmental and other sensors, including user gesture sensors. Finally, an audio codec 1365 is coupled to SoC 1310 to provide an interface to an audio output device 1370. Of course understand that while shown with this particular implementation in FIG. 10, many variations and alternatives are possible.

Figure 11:
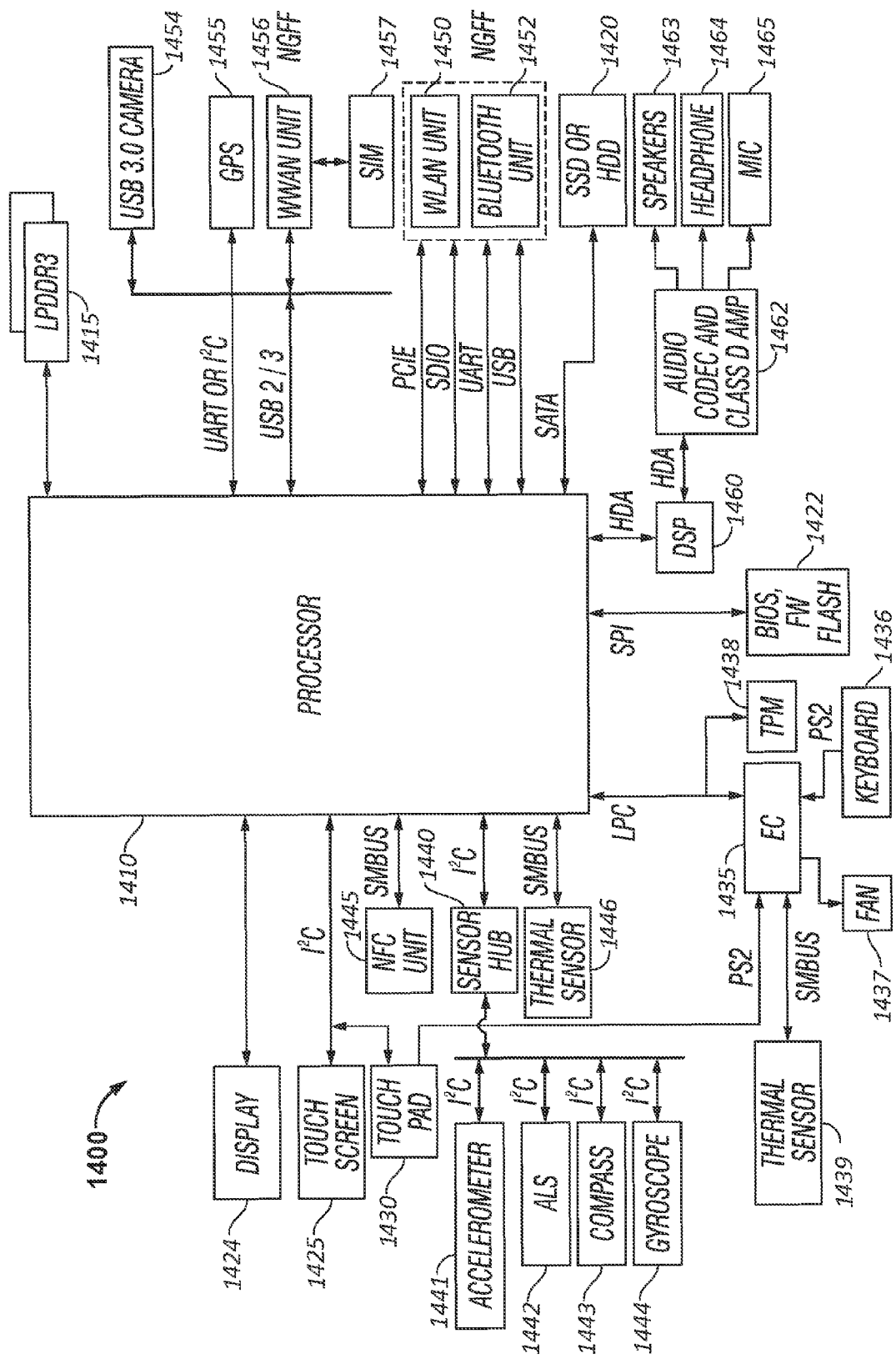
FIG. 11 is a block diagram of a representative computer system.

Referring now to FIG. 11, shown is a block diagram of a representative computer system such as notebook, Ultrabook™ or other small form factor system. A processor 1410, in one embodiment, includes a microprocessor, multi-core processor, multithreaded processor, an ultra low voltage processor, an embedded processor, or other known processing element. In the illustrated implementation, processor 1410 acts as a main processing unit and central hub for communication with many of the various components of the system 1400. As one example, processor 1400 is implemented as a SoC. Processor 1400 may include hardware, software, and/or firmware as described herein to perform location-based security policy operations.

Processor 1410, in one embodiment, communicates with a system memory 1415. As an illustrative example, the system memory 1415 is implemented via multiple memory devices or modules to provide for a given amount of system memory.

To provide for persistent storage of information such as data, applications, one or more operating systems and so forth, a mass storage 1420 may also couple to processor 1410. In various embodiments, to enable a thinner and lighter system design as well as to improve system responsiveness, this mass storage may be implemented via a SSD or the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 11, a flash device 1422 may be coupled to processor 1410, e.g., via a serial peripheral interface (SPI). This flash device may provide for non-volatile storage of system software, including a basic input/output software (BIOS) as well as other firmware of the system, which may be segmented into portions as described herein. Flash device 1422 also may store a set of manifests as described herein.

Various input/output (I/O) devices may be present within system 1400. Specifically shown in the embodiment of FIG. 11 is a display 1424 which may be a high definition LCD or LED panel that further provides for a touch screen 1425. In one embodiment, display 1424 may be coupled to processor 1410 via a display interconnect that can be implemented as a high performance graphics interconnect. Touch screen 1425 may be coupled to processor 1410 via another interconnect, which in an embodiment can be an I2C interconnect. As further shown in FIG. 11, in addition to touch screen 1425, user input by way of touch can also occur via a touch pad 1430 which may be configured within the chassis and may also be coupled to the same I²C interconnect as touch screen 1425.

For perceptual computing and other purposes, various sensors may be present within the system and may be coupled to processor 1410 in different manners. Certain inertial and environmental sensors may couple to processor 1410 through a sensor hub 1440, e.g., via an I²C interconnect. In the embodiment shown in FIG. 11, these sensors may include an accelerometer 1441, an ambient light sensor (ALS) 1442, a compass 1443 and a gyroscope 1444. Other environmental sensors may include one or more thermal sensors 1446 which in some embodiments couple to processor 1410 via a system management bus (SMBus) bus.

Also seen in FIG. 11, various peripheral devices may couple to processor 1410 via a low pin count (LPC) interconnect. In the embodiment shown, various components can be coupled through an embedded controller 1435. Such components can include a keyboard 1436 (e.g., coupled via a PS2 interface), a fan 1437, and a thermal sensor 1439. In some embodiments, touch pad 1430 may also couple to EC 1435 via a PS2 interface. In addition, a security processor such as a trusted platform module (TPM) 1438 in accordance with the Trusted Computing Group (TCG) TPM Specification Version 1.2, dated Oct. 2, 2003, may also couple to processor 1410 via this LPC interconnect.

System 1400 can communicate with external devices in a variety of manners, including wirelessly. In the embodiment shown in FIG. 11, various wireless modules, each of which can correspond to a radio configured for a particular wireless communication protocol, are present. One manner for wireless communication in a short range such as a near field may be via a NFC unit 1445 which may communicate, in one embodiment with processor 1410 via an SMBus. Note that via this NFC unit 1445, devices in close proximity to each other can communicate.

As further seen in FIG. 11, additional wireless units can include other short range wireless engines including a WLAN unit 1450 and a Bluetooth unit 1452. Using WLAN unit 1450, Wi-Fi™ communications in accordance with a given IEEE 802.11 standard can be realized, while via Bluetooth unit 1452, short range communications via a Bluetooth protocol can occur. These units may communicate with processor 1410 via, e.g., a USB link or a universal asynchronous receiver transmitter (UART) link. Or these units may couple to processor 1410 via an interconnect according to a PCIe™ protocol or another such protocol such as a serial data input/output (SDIO) standard.

In addition, wireless wide area communications, e.g., according to a cellular or other wireless wide area protocol, can occur via a WWAN unit 1456 which in turn may couple to a subscriber identity module (SIM) 1457. In addition, to enable receipt and use of location information, a GPS module 1455 may also be present. Note that in the embodiment shown in FIG. 11, WWAN unit 1456 and an integrated capture device such as a camera module 1454 may communicate via a given USB protocol such as a USB 2.0 or 3.0 link, or a UART or I2C protocol.

An integrated camera module 1454 can be incorporated in the lid. To provide for audio inputs and outputs, an audio processor can be implemented via a digital signal processor (DSP) 1460, which may couple to processor 1410 via a high definition audio (HDA) link. Similarly, DSP 1460 may communicate with an integrated coder/decoder (CODEC) and amplifier 1462 that in turn may couple to output speakers 1463 which may be implemented within the chassis. Similarly, amplifier and CODEC 1462 can be coupled to receive audio inputs from a microphone 1465 which in an embodiment can be implemented via dual array microphones (such as a digital microphone array) to provide for high quality audio inputs to enable voice-activated control of various operations within the system. Note also that audio outputs can be provided from amplifier/CODEC 1462 to a headphone jack 1464. Although shown with these particular components in the embodiment of FIG. 11, understand the scope of the present invention is not limited in this regard.

Figure 12:
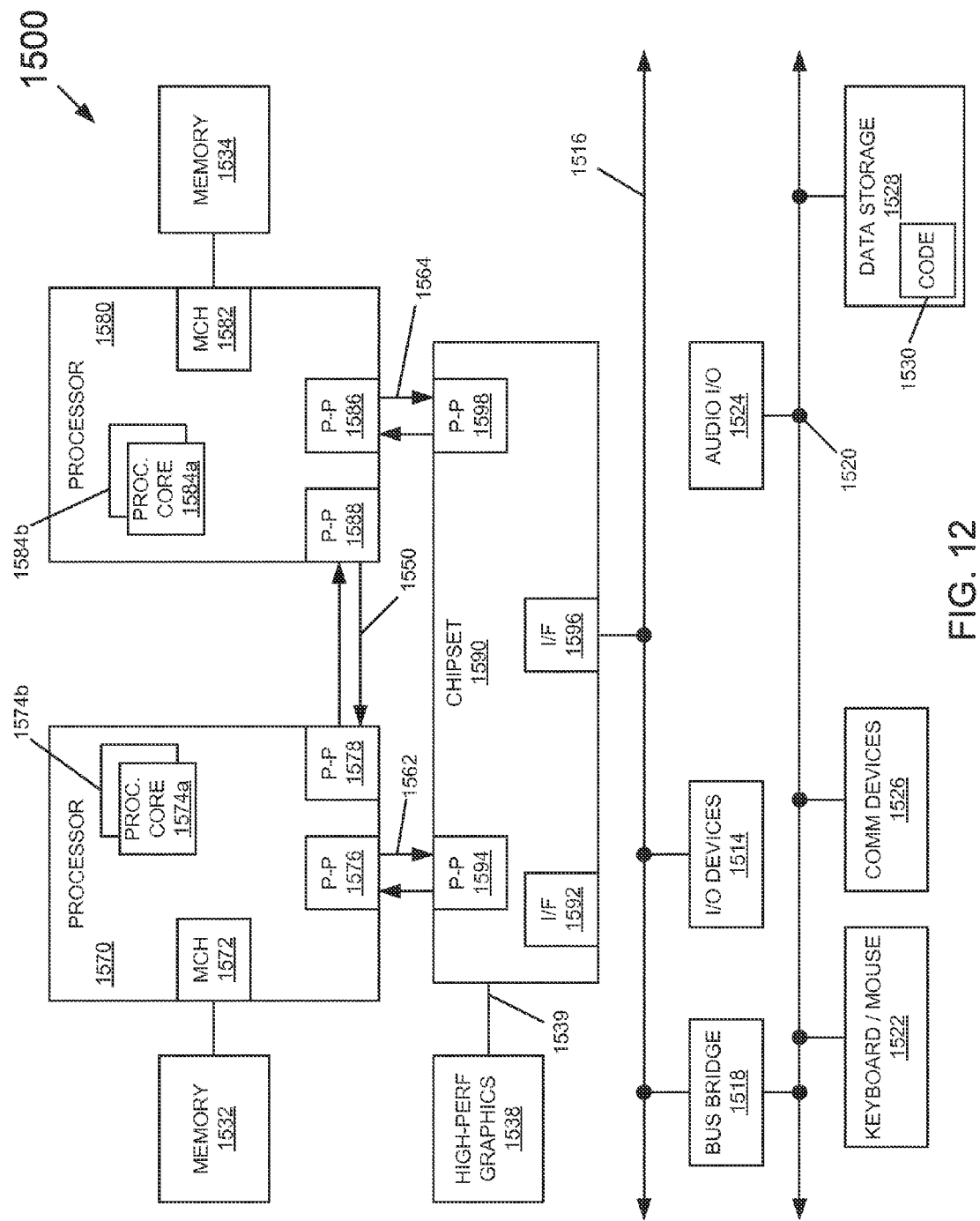
FIG. 12 is a block diagram of a system in accordance with an embodiment of the present invention.

Embodiments may be implemented in many different system types. Referring now to FIG. 12, shown is a block diagram of a system in accordance with an embodiment of the present invention. As shown in FIG. 12, multiprocessor system 1500 is a point-to-point interconnect system, and includes a first processor 1570 and a second processor 1580 coupled via a point-to-point interconnect 1550. As shown in FIG. 12, each of processors 1570 and 1580 may be multicore processors, including first and second processor cores (i.e., processor cores 1574a and 1574b and processor cores 1584a and 1584*b*), although potentially many more cores may be present in the processors. Each of the processors can include hardware and logic to perform the location-based security policy techniques described herein.

Still referring to FIG. 12, first processor 1570 further includes a memory controller hub (MCH) 1572 and point-to-point (P-P) interfaces 1576 and 1578. Similarly, second processor 1580 includes a MCH 1582 and P-P interfaces 1586 and 1588. As shown in FIG. 12, MCH's 1572 and 1582 couple the processors to respective memories, namely a memory 1532 and a memory 1534, which may be portions of system memory (e.g., DRAM) locally attached to the respective processors. First processor 1570 and second processor 1580 may be coupled to a chipset 1590 via P-P interconnects 1562 and 1564, respectively. As shown in FIG. 12, chipset 1590 includes P-P interfaces 1594 and 1598.

Furthermore, chipset 1590 includes an interface 1592 to couple chipset 1590 with a high performance graphics engine 1538, by a P-P interconnect 1539. In turn, chipset 1590 may be coupled to a first bus 1516 via an interface 1596. As shown in FIG. 12, various input/output (I/O) devices 1514 may be coupled to first bus 1516, along with a bus bridge 1518 which couples first bus 1516 to a second bus 1520. Various devices may be coupled to second bus 1520 including, for example, a keyboard/mouse 1522, communication devices 1526 and a data storage unit 1528 such as a disk drive or other mass storage device which may include code 1530 and one or more manifests, in one embodiment. Further, an audio I/O 1524 may be coupled to second bus 1520. Embodiments can be incorporated into other types of systems including mobile devices such as a smart cellular telephone, tablet computer, netbook, Ultrabook™, or so forth.

Embodiments may thus enable automation of policy authoring using context to improve usability, based on inference of similarity of locations and applying similar security precautions. Furthermore, embodiments may infer an acceptable policy based at least in part on additional context. As such, embodiments can analyze user behavior and automatically and dynamically reduce a load that the user would otherwise have to incur to enable particular security features and/or policies at a given location.

The following Examples pertain to further embodiments.

In Example 1, a system comprises: a processor including at least one core to execute instructions; a plurality of sensors, including a first sensor to obtain location information regarding a location of the system; and a security engine to apply a security policy to the system, where the security engine includes a policy logic to determine one of a plurality of security policies to apply based at least in part on the location information, where the location information indicates a location different than locations associated with the plurality of security policies.

In Example 2, the security engine comprises a location policy classifier to determine a similarity between the location of the system and a stored location associated with a security policy of the plurality of security policies, the plurality of security policies stored in a policy database of a storage.

In Example 3, the security engine of Example 2 is optionally to select and directly apply the one of the plurality of security policies to the system if the similarity is greater than a threshold level.

In Example 4, the security engine of one of Examples 2 or 3 is optionally to seek user confirmation of selection of the one of the plurality of security policies if the similarity is less than the threshold level.

In Example 5, the security engine is to not apply the one of the plurality of security policies to the system if the similarity is less than a second threshold level.

In Example 6, the security engine of any of the above Examples is to update a first security policy associated with a first location responsive to analysis of user interaction with the system at the first location.

In Example 7, the security engine of one or more of the above Examples further comprises a first classifier to compare a first string associated with the location information to a second string associated with the one of the plurality of security policies, and to output a first comparison result.

In Example 8, the security engine of Example 7 further comprises a second classifier to compare first information associated with the location information to second information associated with the one of the plurality of security policies, and to output a second comparison result.

In Example 9, the security engine of Example 8 further comprises a third classifier to determine a semantic location similarity between a first ontology associated with the location information and a second ontology associated with a stored location associated with the one of the plurality of security policies, and to output a third comparison result.

In Example 10, the system further comprises a location policy classifier comprising a weighting logic to weight the first comparison result, the second comparison result and the third comparison result to determine a similarity between the location of the system and the stored location associated with the one of the plurality of security policies.

In Example 11, the plurality of sensors further comprises a second sensor to measure environmental information.

In Example 12, the system of Example 11 further comprising a location policy classifier to compare environmental information obtained from the second sensor and associated with the location information to stored environmental information associated with the plurality of security policies, and to output an environmental comparison result, the policy logic to determine the one of the plurality of security policies to apply based at least in part on the environmental comparison result.

In Example 13, the system further comprises a first database to store the plurality of security policies, each of the plurality of security policies associated with location information including one or more of string information, map information, and geographic information.

In Example 14, the system of Example 13 optionally further comprises a second database to store training data, the training data obtained from a remote source and including security policy information and corresponding location information obtained from a plurality of devices of a plurality of users, at a plurality of locations.

In Example 15, a method comprises: receiving location information regarding a location of the system from one or more sources; based on the location information, determining whether a security policy is associated with the location; and if so, applying the security policy to the system, and otherwise determining a similarity between the location of the system and a second location having an associated security policy, and based on the similarity, applying the associated security policy to the system.

In Example 16, the method optionally further comprises: if the similarity is greater than a threshold confidence level, directly applying the associated security policy to the system; and if the similarity is less than the threshold confidence level, determining whether a user accepts the associated security policy, and if so applying the associated security policy to the system.

In Example 17, the method further comprises performing an ontological analysis to determine the similarity based on a type classification for the location of the system.

In Example 18, the method further comprises determining the similarity based at least in part on a classification between training data and environmental information obtained from one or more sensors of the system.

In Example 19, a machine-readable storage medium including machine-readable instructions, when executed, is to implement a method as claimed in any one of above Examples.

In Example 20, a system comprises: a processor including at least one core and a location policy classifier to receive and weight a plurality of classification results from a plurality of sub-classifiers to output a similarity value between a location of the system and a second location associated with a stored security policy, and a policy logic to determine whether to apply the stored security policy to the system based at least in part on the similarity value; at least one sensor to obtain sensor information to be used to determine the location of the system; and at least one user input device to receive user input from a user.

In Example 21, the plurality of sub-classifiers comprises a first classifier to compare a first string associated with the location of the system to a second string associated with the second location, and to output a first comparison result, a second classifier to compare first information associated with the location of the system to second information associated with the second location, and to output a second comparison result, and a third classifier to determine a semantic location similarity between a first ontology associated with the location of the system and a second ontology associated with the second location, and to output a third comparison result.

In Example 22, the location policy classifier is to weight at least one of the first comparison result, the second comparison result, and the third comparison result higher than at least another of the first comparison result, the second comparison result, and the third comparison result.

In Example 23, the processor of one or more of the above Examples comprises a monitor logic to update a first security policy associated with a first location responsive to analysis of user interaction with the system at the first location.

In Example 24, a system comprises: means for receiving location information regarding a location of the system from one or more sources; means for determining whether a security policy is associated with the location; means for applying the security policy to the system if the security policy is associated with the location; means for determining a similarity between the location of the system and a second location having an associated security policy; and means for applying the associated security policy to the system, based on the similarity.

In Example 25, the system optionally further comprises: means for directly applying the associated security policy to the system if the similarity is greater than a threshold confidence level; and means for determining whether a user accepts the associated security policy, if the similarity is less than the threshold confidence level.

In Example 26, the system further comprises means for performing an ontological analysis to determine the similarity based on a type classification for the location of the system.

In Example 27, the system further comprises means for determining the similarity based at least in part on a classification between training data and environmental information obtained from one or more sensors of the system.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A system comprising:
a processor including at least one core to execute instructions;
a plurality of sensors, including a first sensor to obtain location information regarding a location of the system; and
a security engine to apply a security policy to the system, wherein the security engine includes a policy logic to determine one of a plurality of security policies to apply based at least in part on the location information, wherein the location information indicates a location different than locations associated with the plurality of security policies, the security policy to determine one or more of user authentication strength, authentication session duration, and asset access.

2. The system of claim 1, wherein the security engine comprises a location policy classifier to determine a similarity between the location of the system and a stored location associated with a security policy of the plurality of security policies, the plurality of security policies stored in a policy database of a storage.

3. The system of claim 2, wherein the security engine is to select and directly apply the one of the plurality of security policies to the system if the similarity is greater than a threshold level.

4. The system of claim 3, wherein the security engine is to seek user confirmation of selection of the one of the plurality of security policies if the similarity is less than the threshold level.

5. The system of claim 3, wherein the security engine is to not apply the one of the plurality of security policies to the system if the similarity is less than a second threshold level.

6. The system of claim 1, wherein the security engine is to update a first security policy associated with a first location responsive to analysis of user interaction with the system at the first location.

7. The system of claim 1, wherein the security engine further comprises a first classifier to compare a first string associated with the location information to a second string associated with the one of the plurality of security policies, and to output a first comparison result.

8. The system of claim 7, wherein the security engine further comprises a second classifier to compare first information associated with the location information to second information associated with the one of the plurality of security policies, and to output a second comparison result.

9. The system of claim 8, wherein the security engine further comprises a third classifier to determine a semantic location similarity between a first ontology associated with the location information and a second ontology associated with a stored location associated with the one of the plurality of security policies, and to output a third comparison result.

10. The system of claim 9, further comprising a location policy classifier comprising a weighting logic to weight the first comparison result, the second comparison result and the third comparison result to determine a similarity between the location of the system and the stored location associated with the one of the plurality of security policies.

11. The system of claim 1, wherein the plurality of sensors further comprises a second sensor to measure environmental information.

12. The system of claim 11, further comprising a location policy classifier to compare environmental information obtained from the second sensor and associated with the location information to stored environmental information associated with the plurality of security policies, and to output an environmental comparison result, the policy logic to determine the one of the plurality of security policies to apply based at least in part on the environmental comparison result.

13. The system of claim 1, further comprising a first database to store the plurality of security policies, each of the plurality of security policies associated with location information including one or more of string information, map information, and geographic information.

14. The system of claim 13, further comprising a second database to store training data, the training data obtained from a remote source and including security policy information and corresponding location information obtained from a plurality of devices of a plurality of users, at a plurality of locations.

15. At least one non-transitory computer readable storage medium comprising instructions that when executed enable a system to:
receive location information regarding a location of the system from one or more sources;
based on the location information, determine whether a security policy is associated with the location; and
if so, apply the security policy to the system, and otherwise determine a similarity between the location of the system and a second location having an associated security policy via an ontological analysis to determine the similarity based on a type classification for the location of the system, and based on the similarity, apply the associated security policy to the system.

16. The at least one non-transitory computer readable medium of claim 15, further comprising instructions that when executed enable the system to:
if the similarity is greater than a threshold confidence level, directly apply the associated security policy to the system;
if the similarity is less than the threshold confidence level, determine whether a user accepts the associated security policy, and if so to apply the associated security policy to the system.

17. The at least one non-transitory computer readable medium of claim 15, further comprising instructions that when executed enable the system to determine the similarity based at least in part on a classification between training data and environmental information obtained from one or more sensors of the system.

18. A system comprising:
a processor including at least one core and a location policy classifier to receive and weight a plurality of classification results from a plurality of sub-classifiers to output a similarity value between a location of the system and a second location associated with a stored security policy, and a policy logic to determine whether to apply the stored security policy to the system based at least in part on the similarity value;
at least one sensor to obtain sensor information to be used to determine the location of the system;
at least one user input device to receive user input from a user.

19. The system of claim 18, wherein the plurality of sub-classifiers comprises a first classifier to compare a first string associated with the location of the system to a second string associated with the second location, and to output a first comparison result, a second classifier to compare first information associated with the location of the system to second information associated with the second location, and to output a second comparison result, and a third classifier to determine a semantic location similarity between a first ontology associated with the location of the system and a second ontology associated with the second location, and to output a third comparison result.

20. The system of claim 19, wherein the location policy classifier is to weight at least one of the first comparison result, the second comparison result, and the third comparison result higher than at least another of the first comparison result, the second comparison result, and the third comparison result.

21. The system of claim 18, wherein the processor comprises a monitor logic to update a first security policy associated with a first location responsive to analysis of user interaction with the system at the first location.

* * * * *